United States Patent [19]

Seymour et al.

[11] Patent Number: 4,498,830
[45] Date of Patent: Feb. 12, 1985

[54] BALE UNROLLING APPARATUS

[75] Inventors: Shaun A. Seymour, New Holland; James G. Greiner, Leola, both of Pa.

[73] Assignee: Sperry Corporation, New Holland, Pa.

[21] Appl. No.: 523,996

[22] Filed: Aug. 17, 1983

[51] Int. Cl.$^3$ ............................................ A01D 87/12
[52] U.S. Cl. ................................ 414/24.6; 241/101.7
[58] Field of Search ................ 414/24.5, 24.6, 911; 241/101 A, 101.7

[56] References Cited

U.S. PATENT DOCUMENTS

| 4,078,733 | 3/1978 | Popiolek | 414/24.6 X |
| 4,195,958 | 4/1980 | Vahlkamp et al. | 414/24.6 |
| 4,266,899 | 5/1981 | Skeem | 414/24.6 |
| 4,360,167 | 11/1982 | Beccalori et al. | 414/24.6 X |
| 4,428,707 | 1/1984 | Cockle et al. | 414/24.6 |

FOREIGN PATENT DOCUMENTS

| 2,715,577 | 10/1978 | Fed. Rep. of Germany | 414/24.6 |
| 2,810,676 | 9/1979 | Fed. Rep. of Germany | 241/101.7 |
| 2027670 | 2/1980 | United Kingdom | 414/24.6 |
| 2,048,211 | 12/1980 | United Kingdom | 414/24.6 |

Primary Examiner—Leslie J. Paperner
Attorney, Agent, or Firm—Darrell F. Marquette; Frank A. Seemar; Larry W. Miller

[57] ABSTRACT

Apparatus for unrolling roll bales of crop material includes an apron having a horizontal section and an upwardly inclined section at each end of the horizontal section. A finger drum is located adjacent the intersection of the horizontal section and one of the upwardly inclined sections of the apron. The apron is movable in a direction to move a roll bale resting thereon into contact with the finger drum so that the roll bale will be gradually unrolled as it is rotated. Material removed from the roll bale will be carried up one of the inclined sections of the apron to a suitable height for delivery into a feed trough while the other inclined section of the apron prevents the bale from rolling off the apron.

3 Claims, 3 Drawing Figures

BALE UNROLLING APPARATUS

BACKGROUND AND SUMMARY OF THE INVENTION

This invention relates generally to apparatus for unrolling roll bales of crop material. Examples of prior bale unrollers are disclosed in U.S. Pat. Nos. 4,195,958; 4,266,899; and 4,360,167. Generally, these bale unrollers remove material from a roll bale as it is rotated.

The bale unrolling apparatus of the present invention includes an apron having upper and lower runs extending through a first section extending substantially horizontally, a second section disposed at one end of the first section and being inclined upwardly from said one end of the first section, and a third section disposed at the other end of the first section and being inclined upwardly from said other end of the first section. A finger drum is located adjacent said one end of the apron first section.

The apron is movable in a direction to move a roll bale resting thereon into contact with the finger drum so that material will be removed from the roll bale and delivered onto the apron second section. The material is carried up the apron second section to a height suitable for delivery into a feed trough while the apron third section prevents the remainder of the roll bale from rolling off the apron.

DESCRIPTION OF THE PREFERRED EMBODIMENT

Figure 1:
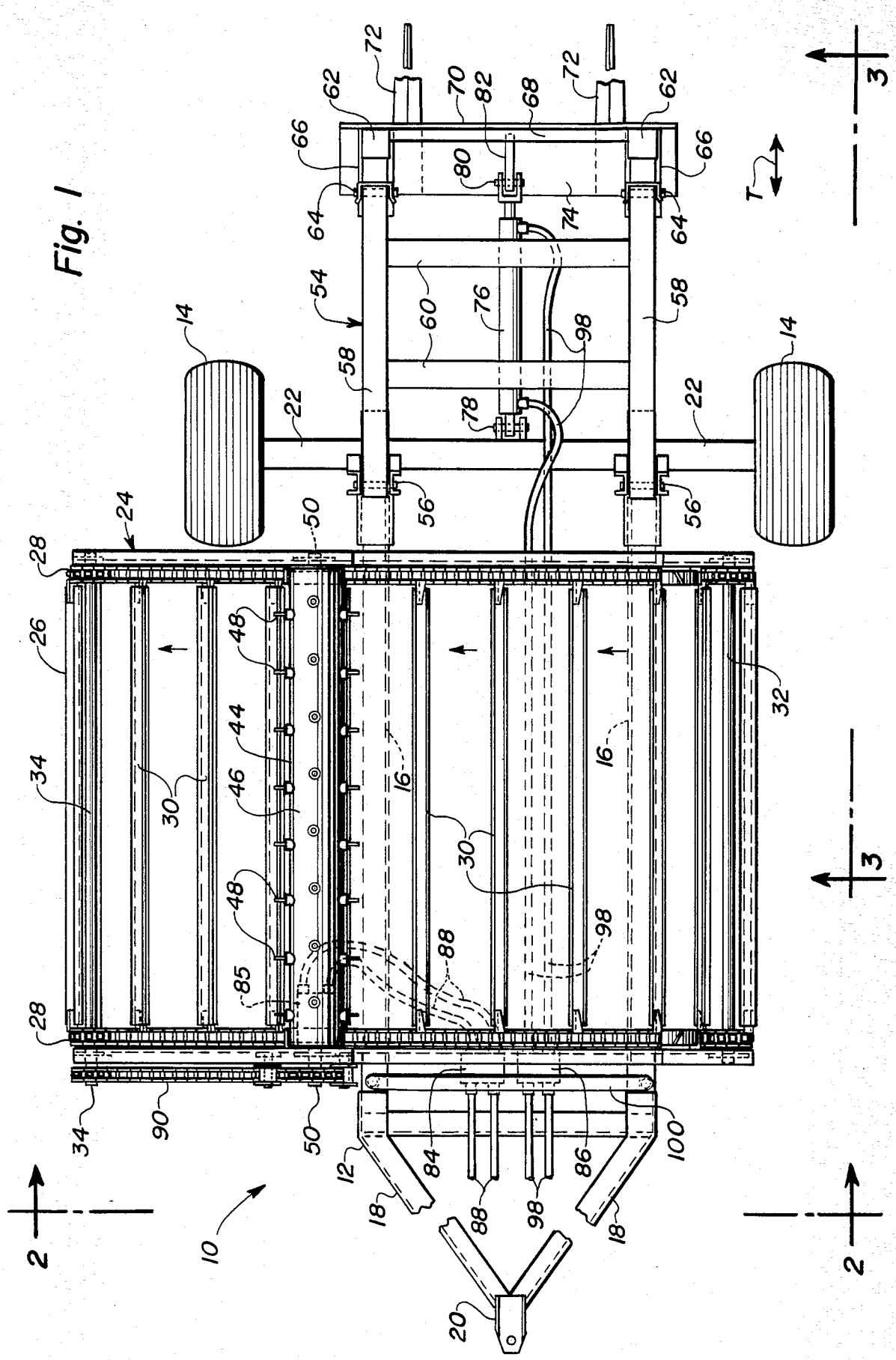
FIG. 1 is a top plan view of a bale unroller embodying the present invention.

Referring to FIG. 1, a bale unroller 10 according to the present invention includes a main frame 12 supported by a pair of wheels 14. The main frame 12 consists of longitudinal beams 16 connected at their forward ends to a tongue 18 which has a hitch member 20 adapted for connection to a towing vehicle such as a tractor (not shown). The rearward ends of the beams 16 are connected to a transverse axle beam 22 on which the wheels 14 are rotatably mounted.

Figure 2:
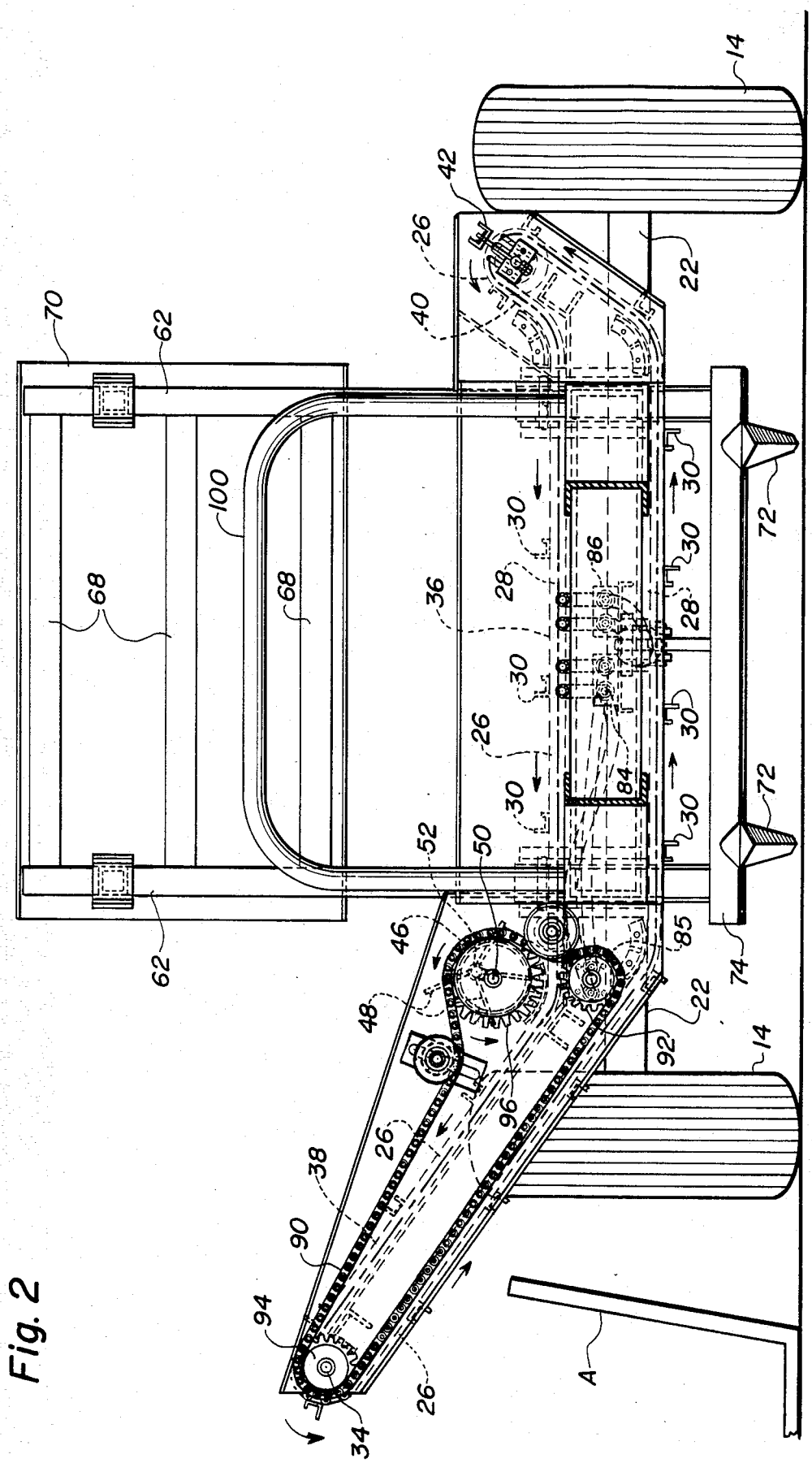
FIG. 2 is a partial sectional view taken along lines 2—2 in FIG. 1.

A bale unrolling assembly 24 is supported on the beams 16 and includes an apron 26 formed of endless link-type chains 28 connected together at spaced intervals by transverse bars or slats 30. The chains 28 are engaged with guide sprockets mounted on shafts 32 and 34 located at the opposite ends of the assembly 24. As best shown in FIG. 2, the apron 26 has upper and lower runs extending through a substantially horizontal first section 36, an inclined second section 38 and an inclined third section 40. The guide sprockets located at the upward end of the third section 40 of apron 26 are adjustable by using a conventional adjusting device 42 to adjust the tension in the upper and lower runs of the apron 26.

The bale unrolling assembly 24 also includes what is commonly known as a finger drum 44 located near the intersection of the first and second sections 36 and 38 of the apron 26. The finger drum 44 consists essentially of a cylinder 46 and a plurality of fingers 48 extending through openings in the cylinder 46. As shown in FIG. 2, the cylinder 46 is mounted on a rotatable shaft 50, and the fingers 48 are connected at their inner ends to a pivot shaft 52 which is offset eccentrically with respect to the shaft 50. Rotation of the shaft 50 and the cylinder 46 causes the fingers 48 to reciprocate into and out of the cylinder 46. The fingers 48 retract into the cylinder 46 as they move close to the apron 26 and then project from the cylinder 46 as they move away from the apron 26.

A bale lifting assembly 54 is connected to the main frame beams 16 by pivot connections 56. The bale lifting assembly 54 includes side beams 58 connected together by cross beams 60 with upright beams 62 pivoted at 64 to the side beams 58 by brackets 66. Further cross beams 68 and a plate member 70 are connected between the upright beams 62. Forks 72 are connected to the upright beams 62 by another cross beam 74. A hydraulic cylinder unit 76 is pivoted at 78 to the axle beam 22 and at 80 to a bracket 82 rigidly attached to the cross beam 74.

Figure 3:
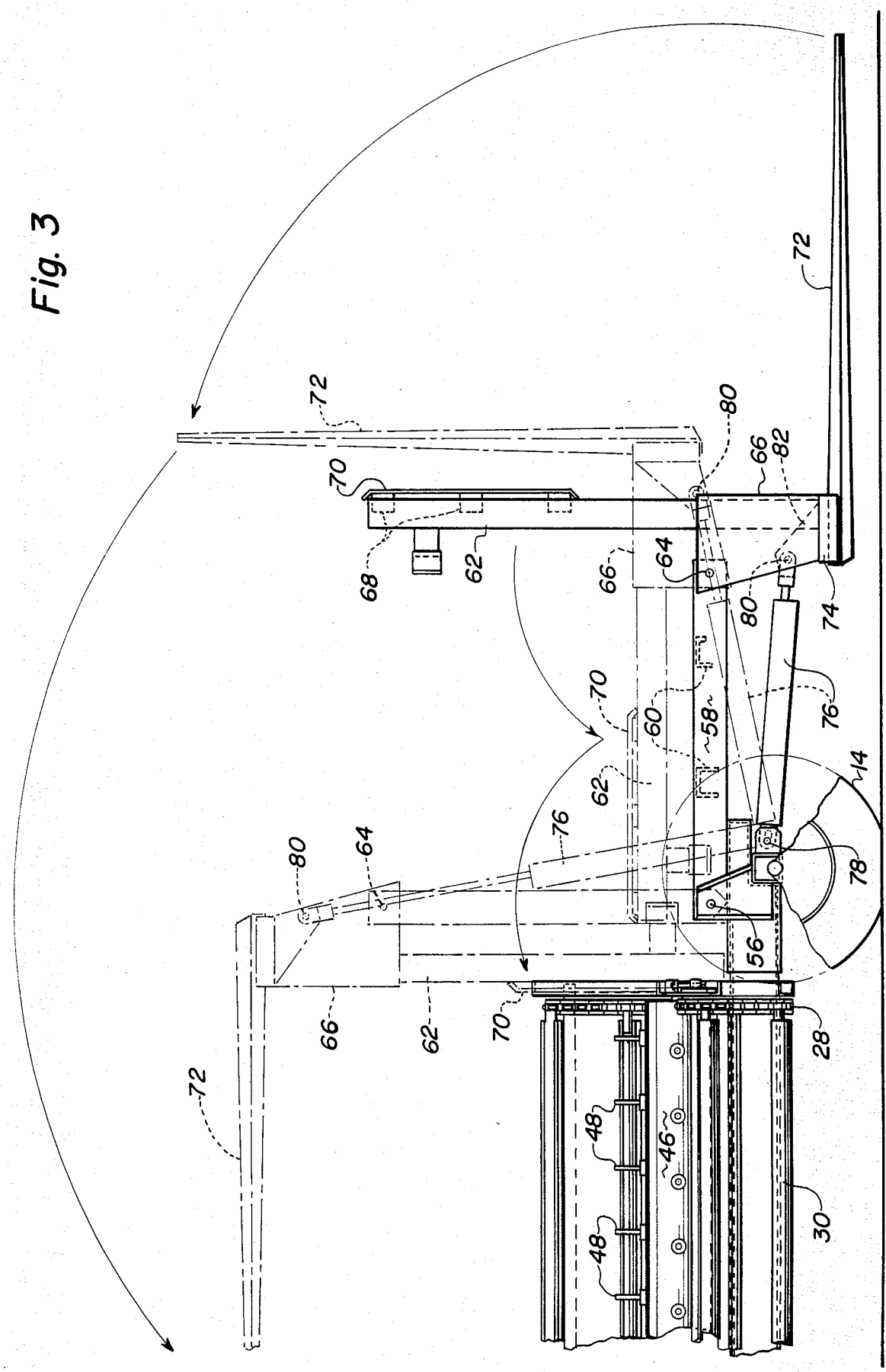
FIG. 3 is a side view of the bale unroller of FIG. 1 taken along lines 3—3 in FIG. 1.

A hydraulic motor 85 is connected through hoses 88 and a pressure relief valve 84 to drive the apron 26 and the finger drum 44 (in the directions indicated by the arrows in FIGS. 1 and 2) via the arrangement of a chain 90 and sprockets 92,94,96. The sprocket 92 is fixed to the output shaft of the hydraulic motor 85. The sprocket 94 is fixed to the shaft 34 on which the guide sprockets for the chains 28 are mounted. The sprocket 96 is fixed to the shaft 50 on which the cylinder 46 of the finger drum 44 is mounted. The hydraulic cylinder unit 76 is connected through hoses 98 and a pressure relief valve 86 to extend and contract the hydraulic cylinder unit 76 in order to raise and lower the forks 72 in the manner indicated by the arrows in FIG. 3. The hoses 88 and 98 are adapted for connection to the hydraulic system of the towing vehicle such as a tractor (not shown).

In use, the bale unroller 10 is maneuvered so that the forks 72 slide under a roll bale with the longitudinal axis of the roll bale arranged parallel to the normal direction of travel T of the bale unroller 10. The hydraulic cylinder unit 76 is then extended thereby raising the forks 72 and lifting the bale upward. The hydraulic cylinder unit 76 is extended until the forks 72 reach their uppermost position shown in phantom in FIG. 3. At this point, the bale drops onto the first section 36 of the apron 26 and rests there between the finger drum 44 and the third section 40 of the apron 26 with the longitudinal axis of the bale still parallel to the normal direction of travel T of the bale unroller 10. A guard rail 100 mounted on the main frame 12 prevents the bale from being pushed too far forward with respect to the apron 26. The hydraulic cylinder unit 76 may then be contracted thereby returning the forks 72 to the position shown in full lines in FIG. 3.

Next, the hydraulic motor 85 is operated to drive the apron 26 and the finger drum 44 in the directions indicated in FIG. 2. The apron 26 moves the bale into contact with the finger drum 44 so that the bale is gradually unrolled as it is rotated clockwise as viewed in FIG. 2. The fingers 48 remove material from the bale and deliver it over the cylinder 46 onto the inclined second portion 38 of the apron 26. The material is carried up the apron second portion 38 to a height suitable for delivery into a feed trough A. Meanwhile, the inclined third section 40 of the apron 26 prevents the remainder of the bale from rolling off the apron 26. The apron 26 may also be driven in a direction opposite to that indicated in FIG. 2. This would be useful in case the space between the finger drum 44 and the apron 26 becomes jammed with material while unrolling a bale.

An important feature of the bale unroller 10 is that the finger drum 44 is positioned close enough to the apron 26 so that, during normal bale unrolling operation, any material which may stick to the finger drum 44 is stripped therefrom by the apron slats 30. This keeps the finger drum 44 clean thereby improving the performance of the bale unroller 10.

The foregoing description illustrates preferred embodiments of the invention. However, concepts employed may, based upon such description, be emmployed in other embodiments without departing from the scope of the invention. Accordingly, the following claims are intended to protect the invention broadly, as well as in the specific forms shown herein.

Having thus described the invention, what is claimed is:

1. An apparatus for unrolling roll bales of crop material, said apparatus comprising:
   (a) a frame;
   (b) an apron movably supported on said frame having upper and lower runs extending through a first section extending substantially horizontally, a second section disposed at one end of said first section and being inclined upwardly from said one end of said first section, and a third section disposed at the other end of said first section and being inclined upwardly from said other end of said first section, said apron including a pair of endless chains connected together at spaced intervals by transverse members;
   (c) a finger drum rotatably supported on said frame and located near the intersection of said first and second sections of said apron, said finger drum including a cylinder and a plurality of fingers which reciprocate into and out of said cylinder as said cylinder rotates, said finger drum being located close enough to said apron so that said transverse members of said apron strip material from said finger drum during rotation thereof;
   (d) said apron being movable in a direction to move a roll bale resting thereon into contact with said finger drum so that material will be removed from said roll bale and delivered over said cylinder onto said second section of said apron; and
   (e) said second section of said apron carrying said material upwardly to a height suitable for delivery into a feed trough while said third section of said apron prevents the remaining portion of said roll bale from rolling off said apron.

2. The apparatus of claim 1, wherein said second section of said apron is considerably longer than said third section of said apron.

3. The apparatus of claim 2, wherein said first and second sections of said apron are approximately the same length.

* * * * *